United States Patent [19]

Kirby

[11] Patent Number: 4,697,667

[45] Date of Patent: Oct. 6, 1987

[54] DEBRIS EJECTOR FOR A SEISMIC VIBRATOR

[75] Inventor: Robert A. Kirby, Houston, Tex.

[73] Assignee: Exxon Production Research Company, Houston, Tex.

[21] Appl. No.: 809,622

[22] Filed: Dec. 16, 1985

[51] Int. Cl.$^4$ .............................................. G01V 1/02
[52] U.S. Cl. .................................. 181/113; 181/114; 181/121; 181/401; 367/189
[58] Field of Search ...................... 367/189, 190, 191; 181/113, 114, 121, 400, 401; 172/40, 39, 606, 609, 461; 73/663, 594; 267/160, 56

[56] References Cited

U.S. PATENT DOCUMENTS

| | | | |
|---|---|---|---|
| 2,986,389 | 5/1961 | Coonrad | 267/56 |
| 4,023,511 | 5/1977 | Newman | 111/89 |
| 4,135,599 | 1/1979 | Fair | 181/121 |
| 4,270,626 | 6/1981 | Pritchett | 181/113 |
| 4,284,163 | 8/1981 | Pritchett | 181/113 |

OTHER PUBLICATIONS

J. F. Bayhi, A. B. Cunningham and L. L. Lenz, Seismic Data Gathering Techniques, at 47–55 (Sep. 1979) (available from Exxon Production Research Company, Houston, Texas).

*Primary Examiner*—Charles T. Jordan
*Assistant Examiner*—John W. Eldred
*Attorney, Agent, or Firm*—Richard F. Phillips

[57] ABSTRACT

The present invention is an improvement to conventional baseplates for imparting seismic energy to an earth formation. A baseplate typically has a plurality of downwardly disposed triangular prism-shaped cleats for engagement with the earth surface above an earth formation under seismological investigation. At least one leaf spring is supported about midway along its length from the lower surface of the baseplate and between the cleats. An elongate horizontal ejector member is slidably interconnected to the respective ends of the spring. In operation, as the baseplate is lowered into engagement with the earth surface the ejector member is moved upward and the leaf spring is compressed. When the baseplate is lifted upward the restoring force of the leaf spring results in a generally downward force against the ejector member. The ejector member, in turn, exerts a downward force against any earth materials lodged between the cleats to facilitate disengagement of the baseplate from the earth surface and to dislodge any compacted materials from between the cleats.

2 Claims, 10 Drawing Figures

DEBRIS EJECTOR FOR A SEISMIC VIBRATOR

FIELD OF THE INVENTION

This invention generally relates to seismic energy vibrators. More particularly, it relates to improvements in the manner in which such vibrators are kept free from the build-up of dirt, mud, ice and other earth materials.

BACKGROUND OF THE INVENTION

In the seismological investigation of subsurface formations various types of seismic energy sources have been used. These sources impart energy to the formation which returns to and is measured by detectors, such as geophones, positioned at various locations near the surface. The detected energy provides lithological and other information about the formation.

Explosive charges are one well known source of such energy. The use of explosive charges is often undesirable due to environmental concerns, safety concerns, storage requirements, and regulations in sensitive and populated areas. As a result, alternate energy sources have been developed which impart controlled vibratory signals to the earth formation.

The most common alternate energy source is a vibrator assembly carried by a land vehicle. The vibrator assembly includes a baseplate which is engaged with the ground. A reaction mass is supported above the baseplate. A vibrating driving force is applied between the baseplate and the reaction mass. The driving force is varied to produce either compressional waves or shear waves in the formation. The baseplate is loaded with the weight of the land vehicle and the reaction mass so that when the driving force is applied to the baseplate it will remain engaged with the ground.

Existing vibrator assemblies have a variety of shortcomings, one of which is related to the structure of the baseplate. Typically, a plurality of cleats project down from the baseplate. The cleats engage the ground and enhance the transfer of seismic energy to the formation. As a result of the large compressional forces placed on the baseplate during the operation of the vibratory source, ice, snow, clay, gravel, mud and other earth materials frequently lodge between the cleats. When earth materials are lodged between the cleats, the baseplate can not fully penetrate the earth surface. As a result, a poor vibrator-earth coupling is obtained, preventing the efficient transfer of vibrational energy to the formation. To assure proper operation when the ground is covered with snow and ice many times workmen must chip snow and ice from between the cleats each time the baseplate is lifted from the earth. This delays and increases the expense of the seismic survey.

It would be advantageous if an apparatus dislodged earth materials from between the cleats as the baseplate is lifted from the earth. It would be further advantageous if the apparatus was simply constructed, effective and reliable, particularly in an arctic environment.

SUMMARY OF THE INVENTION

A baseplate for a seismic vibrator having at least two downwardly projecting cleats includes an ejector assembly secured to the baseplate and positioned between the cleats. During operation of the seismic vibrator, the cleats penetrate the ground and earth materials may become lodged between the cleats. As the baseplate is removed from the ground, the ejector assembly dislodges any earth materials, such as snow, ice and soil, from between the cleats.

BRIEF DESCRIPTION OF THE DRAWINGS

For a better understanding of the present invention reference may be had to the accompanying drawings wherein.

These drawings are not intended as a definition of the invention but are provided solely for the purpose of illustrating the preferred embodiment and two alternative emboidments of the invention described below.

DETAILED DESCRIPTION OF THE INVENTION

Figure 1:
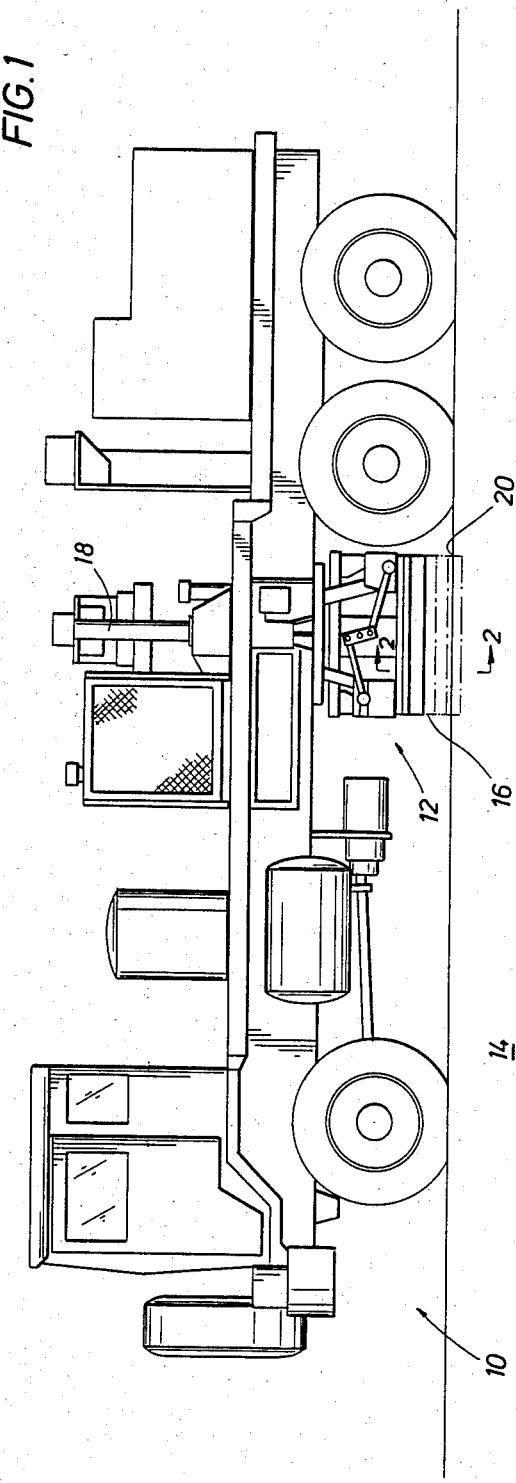
FIG. 1 is a side view of a land vehicle carrying a seismic vibrator assembly incorporating a preferred embodiment of the present invention.

The inventive vibrator apparatus is depicted generally by the FIGURES. Turning to FIG. 1, a land vehicle 10 carries a vibrator assembly 12. As depicted by the phantom lines 16, a hydraulic cylinder assembly 18 lowers the vibrator assembly 12 into engagement with the ground 20 after the vehicle 10 is in the desired position. The land vehicle 10, the vibrator assembly 12, the hydraulic cylinder assembly 18, and an apparatus for imparting a driving force to the vibrator assembly 12 are well known in the art. Consequently, these components will only be described in the detail necessary to describe the particular features of the disclosed invention.

Figure 2:
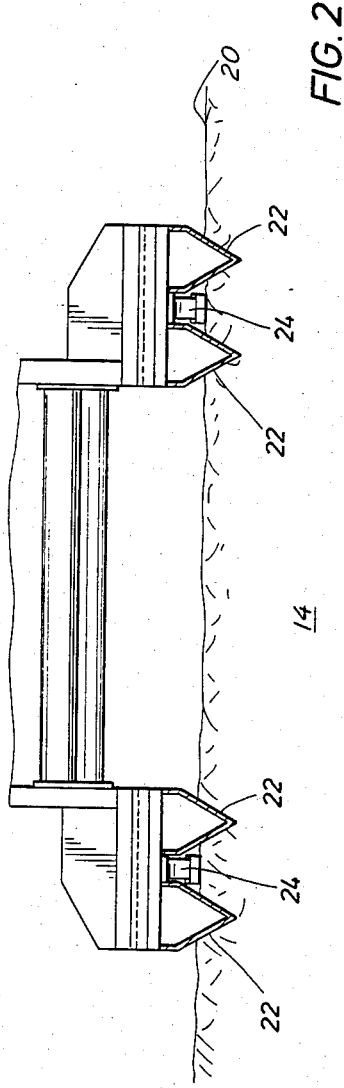
FIG. 2 is a front view of the lower portion of the vibrator assembly carried by the land vehicle taken along line 2—2 in FIG. 1.

Referring to FIG. 2, the lower portion of the vibrator assembly 12 is shown engaged with the ground 20. The lower portion of the vibrator assembly 12 includes a plurality of downwardly projecting cleats 22, described below. Also included in the lower portion of the vibrator assembly 12 is at least one ejector assembly 24. Each ejector assembly 24 is located between a corresponding pair of cleats 22. When the vibrator assembly 12 is lowered into contact with the ground 20 and the weight of the land vehicle 10 is placed on the vibrator assembly 12, the cleats 22 enter the earth formation 14 and the ejector assemblies 24 are forced upward against the lower portion of the vibrator assembly 12.

The cleats 22 are positioned symmetrically about the longitudinal axis of the land vehicle 10. The cleats 22 may vary widely in shape, angular structure, length, and other properties. The structural features of the cleats 22 depend on such factors as the hardness and consistency of the ground 20 and the type of seismic survey being conducted. The cleats 22 preferably take the shape of triangular prisms, cones or pyramids or frustums thereof.

Figures 3, 4:
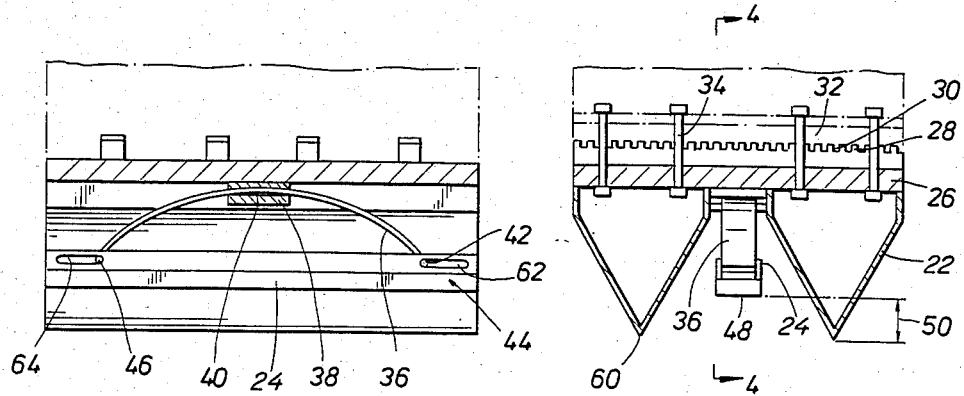
FIG. 3 is a more detailed front view of the lower portion of the vibrator assembly depicted in FIG. 2.
FIG. 4 is a side view, partly in section, of the lower portion of the vibrator assembly taken along line 4—4 in FIG. 3.

A more detailed illustration of the lower portion of the vibrator assembly 12 is shown in FIG. 3. The vibrator assembly 12 includes a lower baseplate 26 and an upper baseplate 32. The upper horizontal surface of the lower baseplate 26 has a tooth rack 28. The lower horizontal surface of the upper baseplate 32 also has a tooth rack 30. The tooth rack 28 and the tooth rack 30 are each comprised of a plurality of teeth or mounting brackets which matingly engage the teeth of the other tooth rack. A plurality of bolts 34 secure the lower baseplate 26 to the upper baseplate 32.

Figures 5, 6:
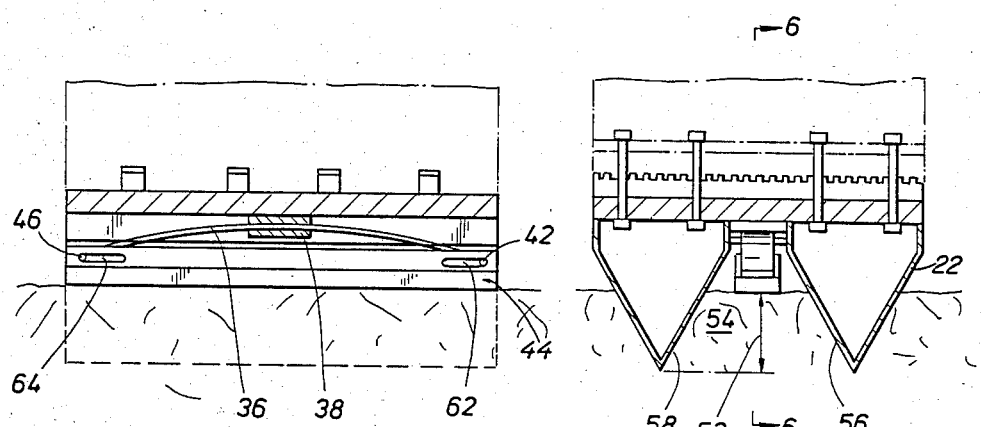
FIG. 5 is a front view of the vibrator assembly depicted in FIG. 3 after being engaged with the earth surface for operation.
FIG. 6 is a side view of the vibrator assembly taken along line 6—6 in FIG. 5.

As shown in FIGS. 3 and 4, the ejector assembly 24 includes an ejector member 44 such as the flat plate shown positioned between the cleats 22. The ejector member 44 is adapted to move from a second position proximate the lower baseplate 26 as the vibrator assembly 12 is lifted from the ground 20. FIG. 3 illustrates the ejector member 44 in the first position and FIG. 5 illustrates the ejector member 44 in the second position. The ejector assembly 24 includes a means for biasing the ejector member 44 away from the lower baseplate 26. In the preferred embodiment, the biasing means is a leaf spring 36. A mounting bracket 38 secures the leaf spring 36 to the lower baseplate 26. The biasing means is adapted to force the ejector member 44 from the second position to the first position. It should be understood that while the preferred embodiment of this invention incorporates a leaf spring 35, other elements, including helical springs, pneumatic or hydraulic cylinders, or an elastomeric material, could also serve as the biasing means. Furthermore, the ejector member 44 could also be a curved surface.

The leaf spring 36 shown in FIGS. 3 and 4 is in a first position where the spring 34 is uncompressed and has a generally concave downward contour. The mounting bracket 38 is attached to the lower surface of the lower baseplate 26 between the cleats 22. The mounting bracket 38 has an aperture 40 for receiving the central portion of the leaf spring 36. Attached to each opposed end of the leaf spring 36 is an end pin 42 and an end pin 46.

The ejector member 44 has a lower surface 48 lying in a plane generally parallel to the lower baseplate 26. Adjacent each opposed end of the ejector member 44 is a corresponding slot 62, 64. The end slots 62, 64 receive the end pins 42, 46, respectively, of the leaf spring 36. Thus, the ejector member 44 is suspended between the cleats 22 on the lower baseplate 26 by the leaf spring end pins 42 and 46. Preferably, the ejector member 44 is suspended so that the bottom surface 48 is above the lower edge 60 of the cleats 22 when the leaf spring 36 is uncompressed. Consequently, as the vibrator assembly 12 engages the ground 20, the cleats 22 penetrate the ground 20 before the ejector member 44 contacts the ground 20. This prevents the ejector member 44 from interfering with the initial penetration of the cleats 22.

Referring to FIGS. 5 and 6, the lower portion of the vibrator assembly 12 is shown in a second position for seismic investigation. The lower edge 60 of each cleat 22 on the lower baseplate 26 is implanted in the ground 20 and the ejector member 44 is forced upward and compresses leaf spring 36. To reach this position the vibrator assembly 12 is lowered until the lower edge 60 of each cleat 22 contacts the ground 20. The weight of the reaction mass and land vehicle 10 are then placed on the vibrator assembly 12 causing the cleats 22 to penetrate the ground 20 and forcing the ejector member 44 toward the baseplate 26. As the ejector member 44 is forced upward the leaf spring 36 is compressed, as shown in FIG. 6. As the leaf spring 36 is compressed, the end pins 42, 46 of the leaf spring 36 slide in end slots 62, 64, respectively, of the ejector member 44.

As mentioned previously, earth material 54 frequently lodges between the cleats 22 as a result of the large downward forces placed upon the lower baseplate 26. FIG. 5 shows earth material 54 between the surfaces 56 and 58 of two adjacent cleats 22 on the lower baseplate 26.

When the leaf spring 36 is compressed, a substantial restorative force from the spring 36 acts to bias the ejector member 44 away from the lower baseplate 26. The force is counteracted by the weight of the vehicle 10 and reactionary mass when the vibrator assembly 12 is loaded during a seismic investigation. However, as the vibrator assembly 12 is lifted, the restorative force of the leaf spring 36 acts to force the ejector member 44 downward to dislodge any earth material 54 from between the cleats 22.

The magnitude of the restorative force is a function of the strength of the leaf spring 36 and the distance the leaf spring 36 is compressed. The leaf spring 36 is shown in FIG. 3 in its relaxed position and shown in FIG. 5 in its compressed position. Preferably, the leaf spring 36 should be selected so as to produce a restorative force, when fully compressed, that is sufficient to eject any earth material 54 that may be lodged between the cleats 22. In addition, the leaf spring 36 should not permanently deform when the lower baseplate 26 is fully loaded.

Figure 7:
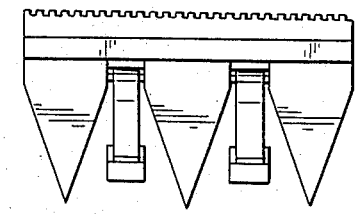
FIG. 7 is a front view of an alternate embodiment of the lower portion of the vibrator assembly of the present invention.

The triangular prism-shaped cleats 22 shown in FIGS. 1 through 6 are merely illustrative. The invention, which generally contemplates at least one spring loaded ejector assembly 24 disposed between at least one pair of cleats 22, is equally applicable to other cleat shapes. For example, FIG. 7 shows three cleats 22 with two ejector assemblies 24 positioned between the cleats 22. Variations in the depth, the spatial position, the edge length, the sharpness and other properties of the cleats 22 are not critical to this invention.

Figure 9:
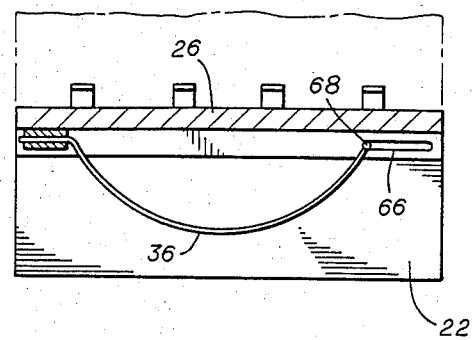
FIG. 9 is a side view, partly in section, of the second alternate embodiment of the vibrator assembly taken along line 9—9 in FIG. 8.
Figure 8:
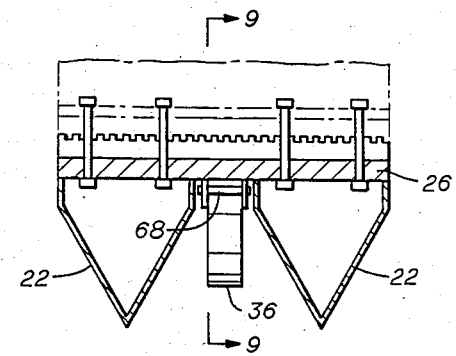
FIG. 8 is a detailed front view of the lower portion of the vibrator assembly of a second alternate embodiment of the present invention.
Figure 10:
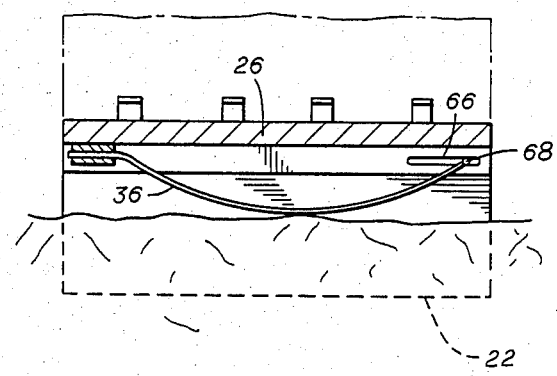
FIG. 10 is a side view of the lower portion of the vibrator assembly featuring the second alternate embodiment engaged with the earth surface.

FIGS. 8, 9 and 10 illustrate another embodiment of the invention. The leaf spring 36 in this embodiment serves both as the ejector member for earth materials and as the means for biasing the ejector member away from the baseplate 26. The lower baseplate 26 includes a slot 66. One end of the leafspring 36 is secured to the baseplate 26 between the cleats 22. The other end of the leafspring 36 includes an end pin 68 adapted to slidingly engage the slot 66. In operation, the leafspring 36 is compressed as the cleats 22 penetrate the ground 20. When the cleats 22 are lifted from the ground 20, the restorative force in the leafspring 26 dislodges any earth materials from between the cleats 22. The end pin 68 slides within slot 66 as the leafspring 26 flexes.

It should be understood that the foregoing description of the invention is only illustrative and explanatory thereof, and that other means and techniques can be employed without departing from the full scope of the invention as set forth in the appended claims.

What is claimed is:

1. A seismic vibrator assembly comprising:
   a baseplate;
   a first cleat secured to said baseplate;
   a second cleat secured to said baseplate, said first and second cleats adapted to penetrate the earth in response to said baseplate being placed upon the earth and being loaded; and
   a leaf spring secured to said baseplate between said first and second cleats, said leaf spring having a compressed position in which said leaf spring is pressed against said baseplate and a relaxed position in which said leaf spring projects outward from said baseplate, whereby in response to lowering said baseplate to a ground engaging position said leaf spring is compressed against said baseplate and in response to raising said baseplate from said ground engaging position said leaf spring resumes its relaxed position, expelling any earth material from between said first and second cleats in so doing.

2. The seismic vibrator assembly as set forth in claim 1 wherein said leaf spring has two ends secured to said baseplate, at least one of said ends being secured to said base in such a manner as to allow said one end to move laterally away from said other end in response to compression of said leaf spring, whereby said leaf spring is compressed flat against said baseplate in response to lowering said baseplate to a ground engaging position.

* * * * *